DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 13, 1970

879 O.G. 366

T879,007

PHOTOGRAPHIC PROCESSING UTILIZING STABILIZING BATHS CONTAINING POLYALKYLENE GLYCOL

Burton D. Wilson, % Kodak Park Works, Rochester, N.Y. 14650

Filed Apr. 13, 1970, Ser. No. 28,064
Int. Cl. G03c *5/38*
U.S. Cl. 96—61
No Drawing. 15 Pages Specification

Stabilizing baths containing from about 30 to about 80 percent by weight of a polyalkylene glycol, especially polyethylene glycol, having an average molecular weight of at least about 1,000, a silver halide stabilizer, and a non-aqueous solvent therefor are utilized in the rapid processing of exposed incorporated developer silver halide photographic emulsion coatings to obtain dry, stable prints and negatives with improved keeping properties. One-step development and stabilization of an exposed photographic silver halide element containing a silver halide developing agent is accomplished by contacting the exposed photographic element with a stabilization bath containing a silver halide stabilizer and polyalkylene glycol maintained at a temperature sufficient to activate the incorporated developer thereby permitting both development of the exposed silver halide in the photographic element and stabilization of the unexposed silver halide. The photographic element can be one containing a silver halide developing agent suitable for so-called dry processing with heat, such as set out in British Pat. 930,572 and/or French Pat. 1,463,243.